(12) United States Patent
Riis et al.

(10) Patent No.: US 7,319,960 B2
(45) Date of Patent: Jan. 15, 2008

(54) SPEECH RECOGNITION METHOD AND SYSTEM

(75) Inventors: Soren Riis, Ballerup (DK); Konstantinos Koumpis, Yorkshire (GB)

(73) Assignee: Nokia Corporation, Espoo (FI)

( * ) Notice: Subject to any disclaimer, the term of this patent is extended or adjusted under 35 U.S.C. 154(b) by 776 days.

(21) Appl. No.: 10/020,895

(22) Filed: Dec. 19, 2001

(65) Prior Publication Data

US 2002/0165715 A1    Nov. 7, 2002

(30) Foreign Application Priority Data

Dec. 19, 2000    (GB) ................. 0030970.8

(51) Int. Cl.
*G10L 15/14* (2006.01)
(52) U.S. Cl. ............ 704/256.4; 704/251; 704/253; 704/254; 704/255; 704/256; 704/256.1; 704/232
(58) Field of Classification Search ............ 704/253, 704/254, 256, 256.1, 256.4, 255, 232, 251
See application file for complete search history.

(56) References Cited

U.S. PATENT DOCUMENTS

| | | | | |
|---|---|---|---|---|
| 5,003,601 | A | | 3/1991 | Watari et al. ............ 381/43 |
| 5,218,668 | A | | 6/1993 | Higgins et al. |
| 5,390,278 | A | * | 2/1995 | Gupta et al. ............ 704/243 |
| 5,617,509 | A | * | 4/1997 | Kushner et al. ......... 704/256 |
| 5,621,859 | A | * | 4/1997 | Schwartz et al. ........ 704/256 |
| 5,638,487 | A | * | 6/1997 | Chigier ................. 704/253 |
| 5,687,287 | A | * | 11/1997 | Gandhi et al. .......... 704/256 |
| 5,737,716 | A | * | 4/1998 | Bergstrom et al. ...... 704/202 |
| 5,745,649 | A | * | 4/1998 | Lubensky ............... 704/232 |
| 6,073,095 | A | * | 6/2000 | Dharanipragada et al. .. 704/242 |
| 6,138,095 | A | * | 10/2000 | Gupta et al. ............ 704/234 |
| 6,505,153 | B1 | * | 1/2003 | Van Thong et al. ...... 704/211 |
| 6,539,353 | B1 | * | 3/2003 | Jiang et al. ............ 704/254 |
| 6,801,891 | B2 | * | 10/2004 | Garner et al. .......... 704/254 |
| 2001/0056346 | A1 | * | 12/2001 | Ueyama et al. ......... 704/246 |

OTHER PUBLICATIONS

D.A. James and S.J. Young. "A Fast Lattice-Based Approach to Vocabulary Independent Wordspotting", ICASSP 1994, pp. 377-380.*

L. R. Bahl, P. F. Brown, P. V. de Souza and R. L. Mercer, "Speech Recognition with Hidden Markov Models of Speech Waveforms," IBM Technical Disclosure Bulletin, vol. 34, No. 1, Jun. 1991, pp. 7-16.*

(Continued)

*Primary Examiner*—David Hudspeth
*Assistant Examiner*—Eunice Ng
(74) *Attorney, Agent, or Firm*—Alston & Bird LLP

(57) ABSTRACT

A speech recognition system uses a phoneme counter to determine the length of a word to be recognized. The result is used to split a lexicon into one or more sub-lexicons containing only words which have the same or similar length to that of the word to be recognized, so restricting the search space significantly. In another aspect, a phoneme counter is used to estimate the number of phonemes in a word so that a transition bias can be calculated. This bias is applied to the transition probabilities between phoneme models in an HNN based recognizer to improve recognition performance for relatively short or long words.

27 Claims, 13 Drawing Sheets

OTHER PUBLICATIONS

Koumpis, K. et al: "Adaptive Transition Bias for Robust Low Complexity Speech Recognition", 2001 IEEE International Conference on Acoustics, Speech, and Signal Processing Proceedings (Cat. No. 01CH37221), May 7-11, 2001, pp. 277-280, vol. 1, XP002232855, Salt Lake City, UT, USA, Piscataway, NJ, ISBN: 0-7803-7041-4.

Gerber, Christoph: "A general Approach to Speech Recognition", Proceedings of the Final Workshop on Multimedia Information Retrieval (MIRO '95), Sep. 18-20, 1995, XP002232856, Glasgow, Scotland, pp. 1-12.

Krogh, Anders et al : "Hidden Neural Networks", Neural Computation, Feb. 15, 1999, MIT Press, USA, vol. 11. No. 2, pp. 541-563, XP002232857, ISSN: 0899-7667.

Russell, M. J., et al: "Measure of Local Speaking-Rate for Automatic Speech Recognition", Electronics Letters, IEE Stevenage, GB, vol. 35, No. 10, May 13, 1999, pp. 787-789, XP 006012165, ISSN: 0013-5194.

European Search Report.

Lawrence R. Rabiner; A Tutorial on Hidden Markov Models and Selected Applications in Speech Recognition; Proceedings of the IEEE; Feb. 2, 1989; vol. 77; Issue 22.

Soren Kamaric Riis; Hidden Markov Models and Neural Networks for Speech Recognition; Ph.D. Technical University of Denmark, Department of Mathematical Modelling; Thesis; Apr. 20, 1998; Lyngby, Denmark.

Soren Kamaric Riis & Olli Viikki; Low Complexity Speaker Independent Command Word Recognition in Car Environments.

Youngjoo Suh & Younjik Lee; Phoneme Segmentation of Continuous Speech Using Multi-Layer Perceptron.

* cited by examiner

SPEECH RECOGNITION METHOD AND SYSTEM

FIELD OF THE INVENTION

This invention relates to a method of speech recognition and a speech recognition system.

BACKGROUND

Speaker independent phoneme based command word recognition and name dialling on portable devices such as mobile telephones and personal digital assistants has attracted significant interest recently. A phoneme based speaker independent recognition system provides a way around keypad limitations and offers more convenient hands-free operation. This allows safer use of portable devices in, for example, car environments. The speaker independence makes the system particularly attractive from a user point of view compared to speaker dependent systems. For large vocabularies, for example, command word lists or names in a phonebook, training of a speaker dependent recogniser is too tedious to be useful.

In contrast, a phoneme based speaker independent system is ready to use 'out of the box', i.e. it does not require any training session from the speaker. All that is required is a textual representation of the words or names in the recognition vocabulary along with some means of phonetically transcribing the text. Furthermore, speaker independent systems are only capable of supporting a single or a few languages at the same time, so that a separate set of phoneme models must be stored in the device for each supported language or set of languages. This increases the static memory requirements for the phoneme models.

Speech recognition in unknown environments is a very challenging task, as the recogniser must be robust in the presence of the noise and distortion encountered in the operating environment. In addition, the recogniser must be of sufficiently low complexity to be able to run on portable devices like mobile phones which inherently have limited memory and computational resources. Although the computational power of portable devices is rapidly increasing with time, the number of applications required to run simultaneously is also increasing. Therefore, complexity and memory requirements of any application running on a portable device will always be an issue.

A simple model of a conventional general purpose speech recognition system is shown in FIG. 1. Speech frames are derived from a speech signal using a speech pre-processor 1 and processed by a time alignment and pattern matching module 2 in accordance with an acoustic model 3 and a language model 4 to produce a recognition result. The language model includes a lexicon 5 which defines the vocabulary of the recogniser.

The pre-processor 1 transforms the raw acoustic waveform of the speech signal into an intermediate compressed representation that is used for subsequent processing. Typically, the pre-processor 1 is capable of compressing the speech data by a factor of 10 by extracting a set of feature vectors from the speech signal that preserves information about the uttered message. Commonly used techniques for pre-processing are filter bank analysis, linear prediction analysis, perceptual linear prediction and cepstral analysis.

Since the duration of words to be recognised are not known in advance, the process of time alignment and pattern matching is required to align hypothesised word sequences to the acoustic signal. The time alignment and pattern matching process uses information from both the acoustic model 3 and the language model 4 to assign a sequence of words to the sequence of speech frames. The acoustic model enables the speech frames to be translated to the basic units of a language such as words, syllables or phonemes that can be concatenated under the constraints imposed by the language model to form meaningful sentences. The time alignment method depends on the form of the acoustic model. Two well-known methods include dynamic time warping and Hidden Markov Modelling.

Dynamic time warping is a so-called template based approach in which the acoustic model is a collection of pre-recorded word templates. The basic principle of dynamic time warping is to align an utterance to be recognised to each of the template words and then to select the word or word sequence that provides the best alignment. However, this technique suffers from a number of drawbacks including the difficulty of modelling acoustic variability between speakers and the difficulty of providing templates for speech units other than whole words.

As a result of the problems associated with dynamic time warping, much of the recent work in speech recognition has concentrated on hidden Markov modelling (HMM), which removes the need to create a reference template by using a probabilistic acoustic model. In continuous speech recognition, the word models are typically constructed as a sequence of phoneme acoustic hidden Markov models corresponding to the word in question. A phoneme acoustic model is a statistical model, which gives the probability that a segment of the acoustic data belongs to the phoneme class represented by the model. Decoding in HMM models is done using, for example, a Viterbi or Forward decoder. Reference is directed to Rabiner, "A tutorial on hidden Markov models and selected applications in speech recognition", Proc. IEEE, vol. 77, no. 2, February 1989, for an in-depth explanation of hidden Markov models.

A variant of the HMM model is known as the Hidden Neural Network model, which is an HMM/neural network hybrid. Reference is directed to [1] S. K. Riis, "Hidden Markov Models and Neural Networks for Speech Recognition", Ph.D. Thesis, Department of Mathematical Modelling, Technical University of Denmark, May 1998 and [2] S. K. Riis and O. Viikki "Low Complexity Speaker Independent Command Word Recognition in Car Environments", Proc. of the ICASSP, Vol. 2, pp. 1743-1746, Istanbul, May 2000, for a detailed explanation of HNNs.

One problem with the conventional approach to speech recognition is that every time a word boundary is hypothesised, the lexicon 5 which forms part of the language model has to be searched. For even a modest size of vocabulary, this search is computationally expensive. Several approximate fast match and pruning strategies have been proposed in order to speed up the search. Many of these use multi-pass decoding algorithms in which each pass prepares information for the next one, thereby reducing the size of the search space.

A further problem with conventional speech recognition is that the recogniser can have a preference for words of a certain length. For example, if non-uniform transition probabilities are used between states in HNN- or HMM-based recognisers, the recogniser often tends to favour short (long) words over the long (short) words in the lexicon.

The present invention aims to address the above problems.

SUMMARY OF THE INVENTION

According to a first aspect of the invention there is provided a speech recognition system, comprising means for determining the length of a speech portion to be recognised, means for defining a subset of speech portions from a set of stored speech portions in dependence on the determined length, and recognition means for recognising the speech portion from the subset of speech portions.

By restricting the search space required by the recognition means to speech portions which have a similar length to the speech portion to be recognised, significant performance improvements may be achievable.

The subset defining means can be arranged to define a subset of speech portions for each speech portion to be recognised, so producing subsets on a dynamic basis.

The determining means can comprises a neural network classifier such as a multi-layer perceptron.

The set of speech portions can comprise a lexicon and the subset of speech portions can comprises a sub-lexicon, the sub-lexicon comprising speech portions having a length similar to or the same as that of the speech portion to be recognised and the length of the speech portions in the sub-lexicon can be determined in accordance with a confidence level associated with the length determining means.

The speech portion can comprise a word and the length determining means can be arranged to detect the number of phonemes in the word.

According to a first aspect of the invention, there is further provided a speech recognition system, comprising a memory for storing a lexicon of speech portions, a counter arranged to determine the length of a speech portion to be recognised, a sub-lexicon definition module arranged to define a sub-lexicon from the lexicon of speech portions in dependence on the determined length and a recognition module for recognising the speech portion from the sub-lexicon of speech portions.

The first aspect of the invention also provides a method of speech recognition, comprising determining the length of a speech portion to be recognised, defining a subset of a set of stored speech portions in dependence on the determined length and recognising the speech portion from the subset of speech portions.

According to a second aspect of the invention, there is provided a speech recognition system in which an utterance to be recognised is represented as a sequence of phonetic segment models in which a transition probability represents the probability of the occurrence of a transition between the models, comprising means for biasing the transition probabilities in dependence on the length of the utterance. The biasing means can comprise means for applying a transition bias to each of the transition probabilities between a plurality of phonetic segment models.

By applying an adaptive transition bias, i.e. a bias which depends on utterance or word length, to the transition probabilities, the tendency of the recogniser, particularly an HNN recogniser, to prefer words of a certain length can be controlled, so that recognition performance for relatively short and/or relatively long words can be improved.

The speech recognition system may be operable to recognise utterances from a recognition vocabulary, wherein the transition bias is calculated as the transition bias which maximises recognition performance on a validation data set which represents the recognition vocabulary, for example has the same vocabulary as the recognition vocabulary.

The speech recognition system according to the invention can further comprise means for estimating the number of phonetic segments in the utterance to be recognised, such as a speaker specific rate of speech estimator, a Free Order Viterbi decoder or a neural network classifier. The transition bias can be set in response to the result of the estimating means, by a table look-up to set the transition bias to selected predetermined values in accordance with the number of phonetic segments in the utterance, or by direct setting of the bias to be proportional to the number of phonetic segments in the utterance, for example equal to the number of phonetic segments in the utterance.

According to a second aspect of the invention, there is further provided a speech recognition system in which an utterance to be recognised is represented as a sequence of phonetic segment models in which a transition probability represents the probability of the occurrence of a transition between the models, comprising a phonetic segment estimator arranged to output an estimate of the number of phonetic segments in the utterance and a processing module for applying a transition bias to the transition probability in response to the output of the estimator.

The second aspect of the invention also provides a method of speech recognition in which an utterance to be recognised is represented as a sequence of phonetic segment models in which a transition probability represents the probability of the occurrence of a transition between the models, the method comprising biasing the transition probabilities in dependence on the word length. The sequence of phonetic segment models can be decoded after application of the transition bias to the transition probabilities or without the application of transition bias, by normalising the resulting scores by a contribution proportional to the transition bias. In the latter case, the transition bias can be calculated in parallel with the decoding of the sequence of phonetic segment models.

BRIEF DESCRIPTION OF THE DRAWINGS

Embodiments of the invention will now be described, by way of example, with reference to the accompanying drawings, in which.

DETAILED DESCRIPTION

Figure 2:
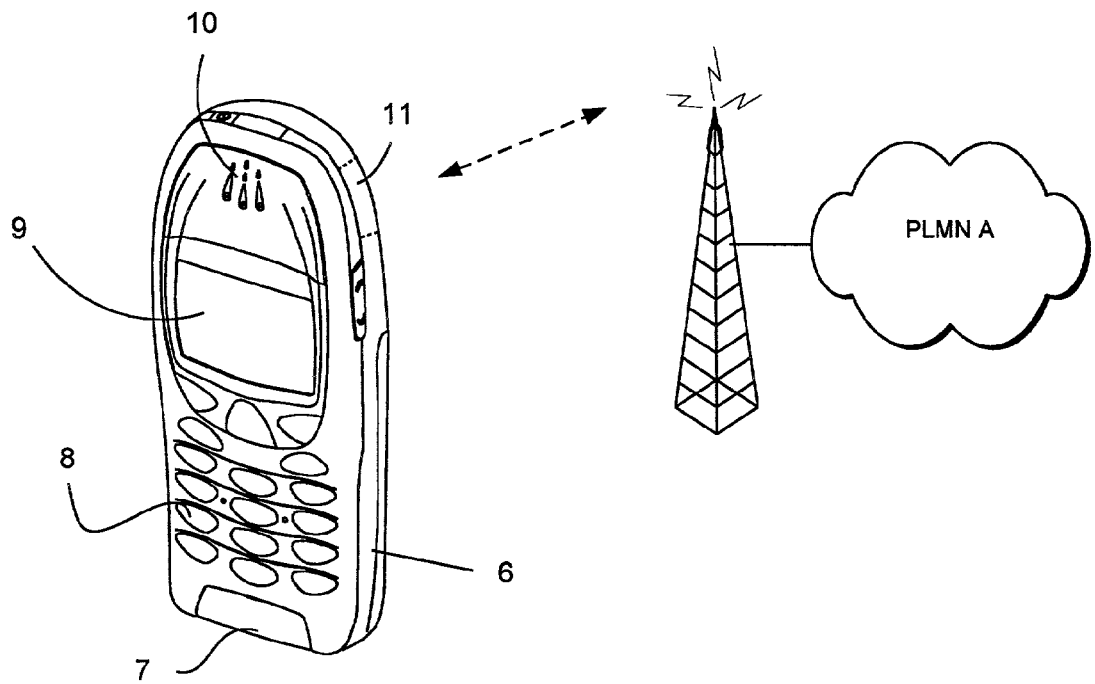
FIG. 2 is a perspective view of a mobile telephone handset.

Referring to FIG. 2, a portable device such as a mobile telephone handset 6 includes a microphone 7, keypad 8, LCD display 9, speaker 10 and antenna 11, which is contained within the housing.

The portable device is operable to communicate through cellular radio links with a PLMN (public land mobile network) shown schematically as PLMN A.

Figure 3:
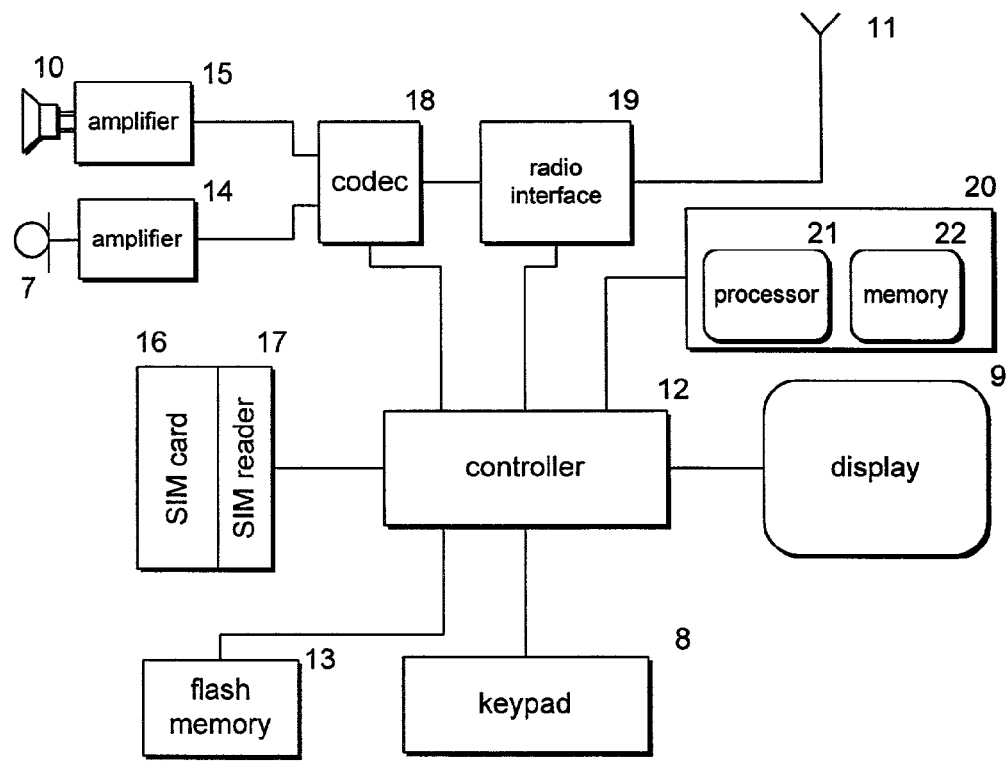
FIG. 3 is a schematic diagram of mobile telephone circuitry for use in the telephone handset of FIG. 2.

FIG. 3 illustrates the major circuit components of the telephone handset 6. Signal processing is carried out under the control of a digital micro-controller 12 which has an associated flash memory 13. Electrical analogue audio signals are produced by microphone 7 and amplified by pre-amplifier 14. Similarly, analogue audio signals are fed to the speaker 10 through an amplifier 15. The micro-controller 12 receives instruction signals from the keypad 8 and controls operation of the LCD display 9.

Information concerning the identity of the user is held on a smart card 16 in the form of a GSM SIM card which contains the usual GSM international mobile subscriber identity (IMSI) and an encryption key $K_i$ that is used for encoding the radio transmission in a manner well known per se. The SIM card is removably received in a SIM card reader 17.

The mobile telephone circuitry includes a codec 18 and an rf stage 19 feeding the antenna 11. The circuitry further includes a speech recognition module 20 including a processor 21 and memory 22, for example for storing the speech recognition software and holding the lexicon 5. The speech recognition module 20 recognises voice commands to perform tasks such as dialling a number automatically.

Figure 4:
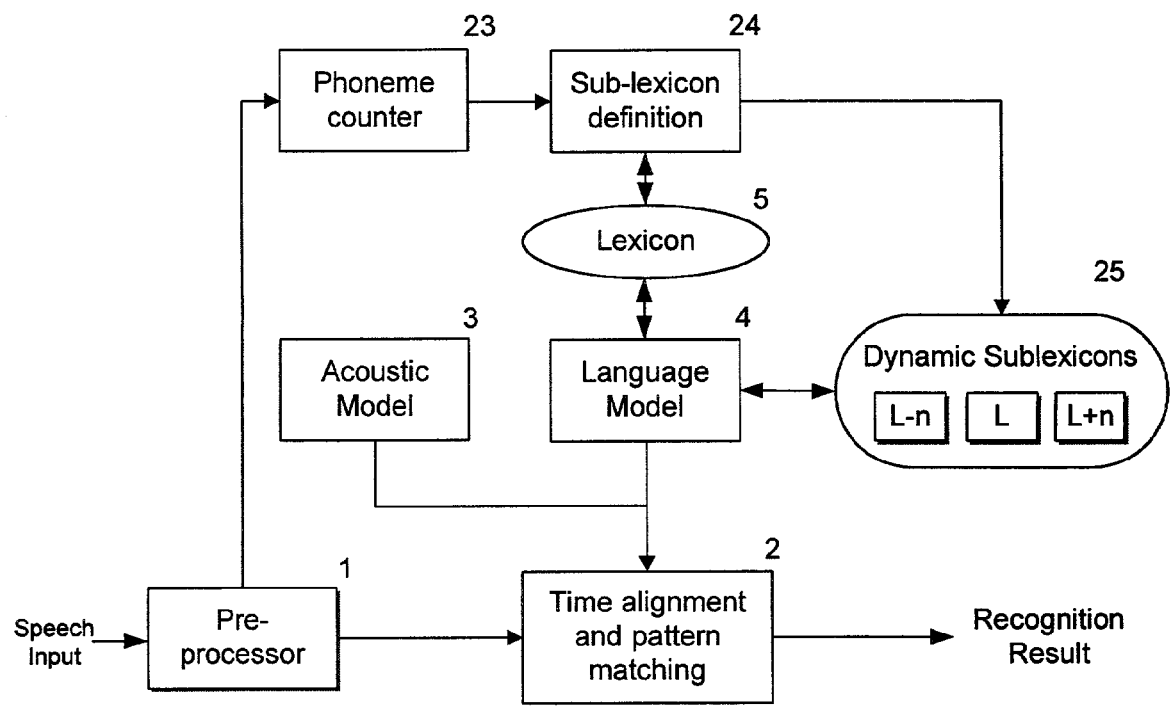
FIG. 4 is a speaker recognition system in accordance with the invention.

FIG. 4 illustrates a first example of a system for performing speech recognition in accordance with the invention. The speech recognition system has the same basic components as the general speech recognition system shown in FIG. 1, namely a pre-processor 1 for extracting a set of feature vectors from the speech signal and a time alignment and pattern matching module 2 which uses information from an acoustic model 3 and a language model 4 to produce a recognition result. The language model 4 includes a lexicon 5 which defines the vocabulary of the recognition system. In addition, the recognition system according to the first embodiment includes a phoneme counter 23 and a sub-lexicon definition module 24 which produces a set of dynamic sub-lexicons 25.

Figure 5:
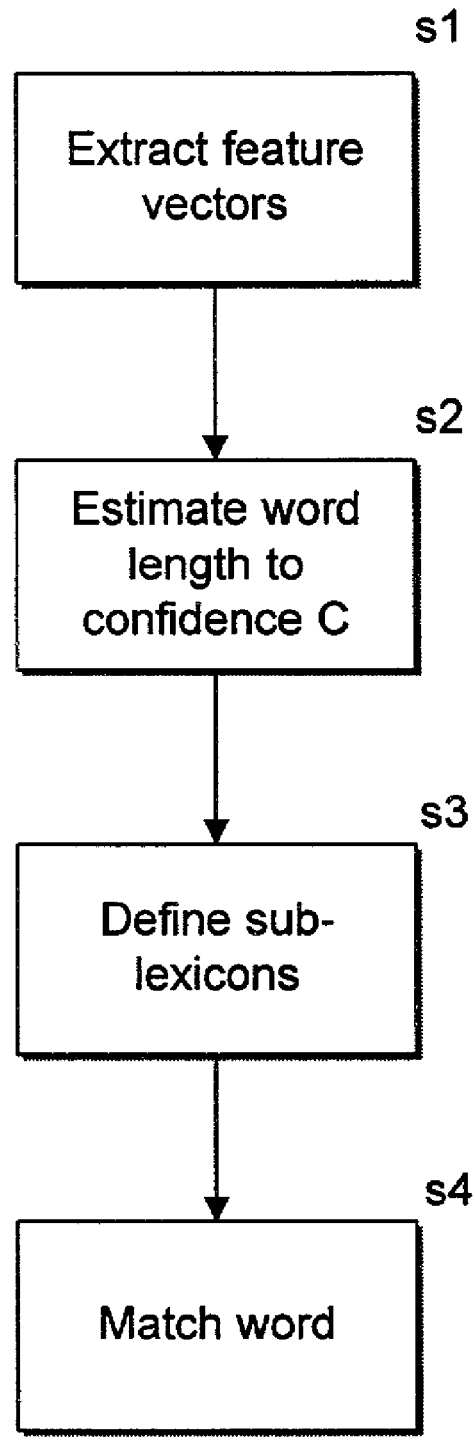
FIG. 5 is a flow diagram illustrating the operation of the recognition system of FIG. 4.

The operation of the speech recogniser of FIG. 4 is now explained with reference to FIG. 5. The speech pre-processor 1 first extracts a set of feature vectors from a digitised speech signal, for example, telephone speech sampled at 8000 samples per second (step s1). The feature vectors are computed every 10 msec, with one 10 msec section called a frame. For example, each frame contains 12 mel—frequency cepstrum coefficients (MFCCs), together with one energy feature, making a total of 13 features per frame.

The phoneme counter 23 estimates the length L of a word to be recognised together with a confidence level C (step s2). The phoneme boundaries are estimated directly from a set of feature vectors produced by the pre-processor 1. The phoneme counter 23 is, for example, a neural network classifier, such as a multi-layer perceptron MLP) with 2K weights and a single hidden layer of 20 to 30 units. Reference is directed to J. Suh and Y. Lee "Phoneme segmentation of continuous speech using multilayer perceptron", Proc. of the ICSLP, Vol. 3, pp. 1297-1300, Philadelphia, Pa., USA, 1996, for a detailed explanation of the use of an MLP in the phoneme segmentation of continuous speech. The confidence level C calculated by the MLP-based phoneme counter 23 is used to ensure that the correct word is not excluded from the decoding procedure as a result of an error in the number of phonemes detected.

The sub-lexicon definition module 24 uses the phoneme count and the confidence level C to define a set of dynamic sub-lexicons 25 to be searched (step s3). For example, the phoneme count indicates that the word length is L but the confidence level C indicates that this count is only accurate to +/−1 phoneme. In this case, the current word may be of length L−1, L or L+1, so the sub-lexicon definition module 24 selects these three sub-lexicons from the lexicon 5. As an alternative, the three sub-lexicons can be collected into a single sub-lexicon containing words with L−1, L and L+1 phonemes and the combined sub-lexicon searched. To speed up selection of the sub-lexicon, the lexicon 5 is sorted according to phoneme counts.

An example of a lexicon file for a British English command word task is given below. The length of the corresponding phoneme sequence is given in parentheses.

k-ao-l*-b-ay*-n-ey-m, call_by_name (length 8)
k-ao-l-b-ay-n-ah-m-b-ax, call_by_number (length 10)
k-ao-l-b-ay-n-ah-m-b-ax-r, call_by_number (length 11)
k-ae-n-s-ax-l, cancel (length 6)
ch-eh-k, check (length 3)
k-l-ia-r, clear (length 4)
k-ax-n-eh-k-t, connect (length 6)
k-ax-n-t-ih-n-y-uw, continue (length 8)
d-ih-l-iy-t, delete (length 5)
d-ay-ax-l, dial (length 4)

So assuming that the phoneme counter 23 estimates that the spoken word is 5 phonemes long, and the calculated confidence level means that it may have 6 phonemes or 4 phonemes, then the three dynamic sub-lexicons 25 created are shown below:

length 4
k-l-ia-r, clear
d-ay-ax-l, dial length 5
d-ih-l-iy-t, delete length 6
k-ae-n-s-ax-l, cancel
k-ax-n-eh-k-t, connect Once the sub-lexicons 25 have been defined, the time alignment and pattern matching module 2 then uses a Viterbi or Forward search to match the phoneme models to the word to be recognised in order to determine the word that was most likely uttered (step s4). However, the search is only performed over the dynamic sub-lexicons 25 rather than the whole of the lexicon 5.

Figure 6:
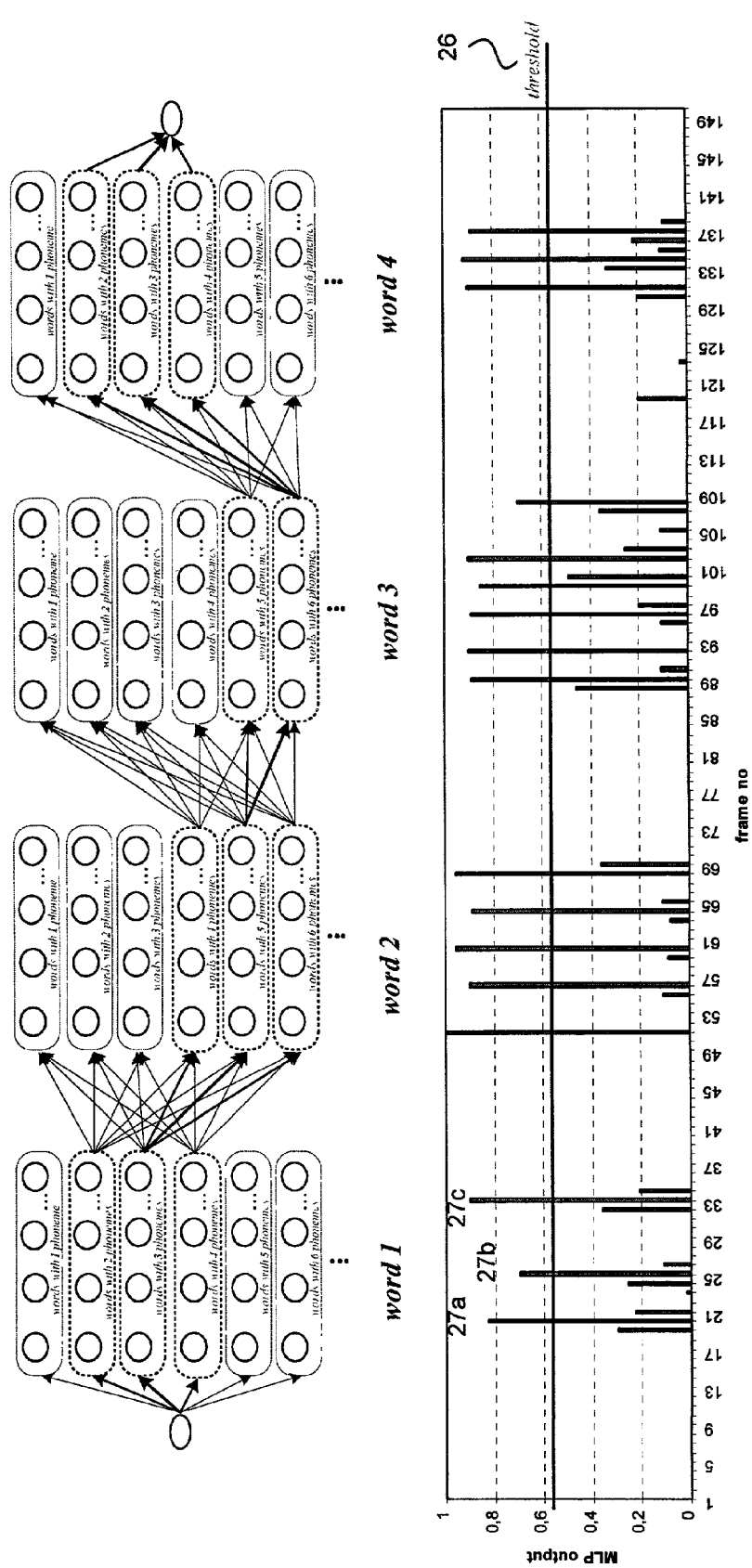
FIG. 6 illustrates how the output from the phoneme counter is used to restrict the search to sub-lexicons each time a word is hypothesised in continuous speech recognition.

FIG. 6 illustrates how the MLP phoneme counter 23 is used in continuous speech recognition to restrict the search space for a phrase of four words. The phoneme counter 23 is set up with a threshold 26 so that the output of the MLP indicates the number of phoneme boundaries with a given confidence level C. For example, for word 1 in FIG. 4, the three peaks 27a, 27b, 27c above the threshold 26 indicate that the word being processed has 3 phonemes. It is apparent from the graph of the MLP output that raising the threshold 26 will cause the MLP to indicate fewer phoneme boundaries, while lowering it will cause the MLP to indicate an increased number of phoneme boundaries.

For each word 1-4, only those sub-lexicons corresponding to word lengths L, L−1 and L+1 are searched. For example, for word 1, the MLP output indicates a word length of 3, so only sub-lexicons including words of length 2, 3 or 4 are included in the search space. For word 2, where a length of 5 is indicated, sub-lexicons including words of length 4, 5 or 6 are included in the search space.

Figure 7:
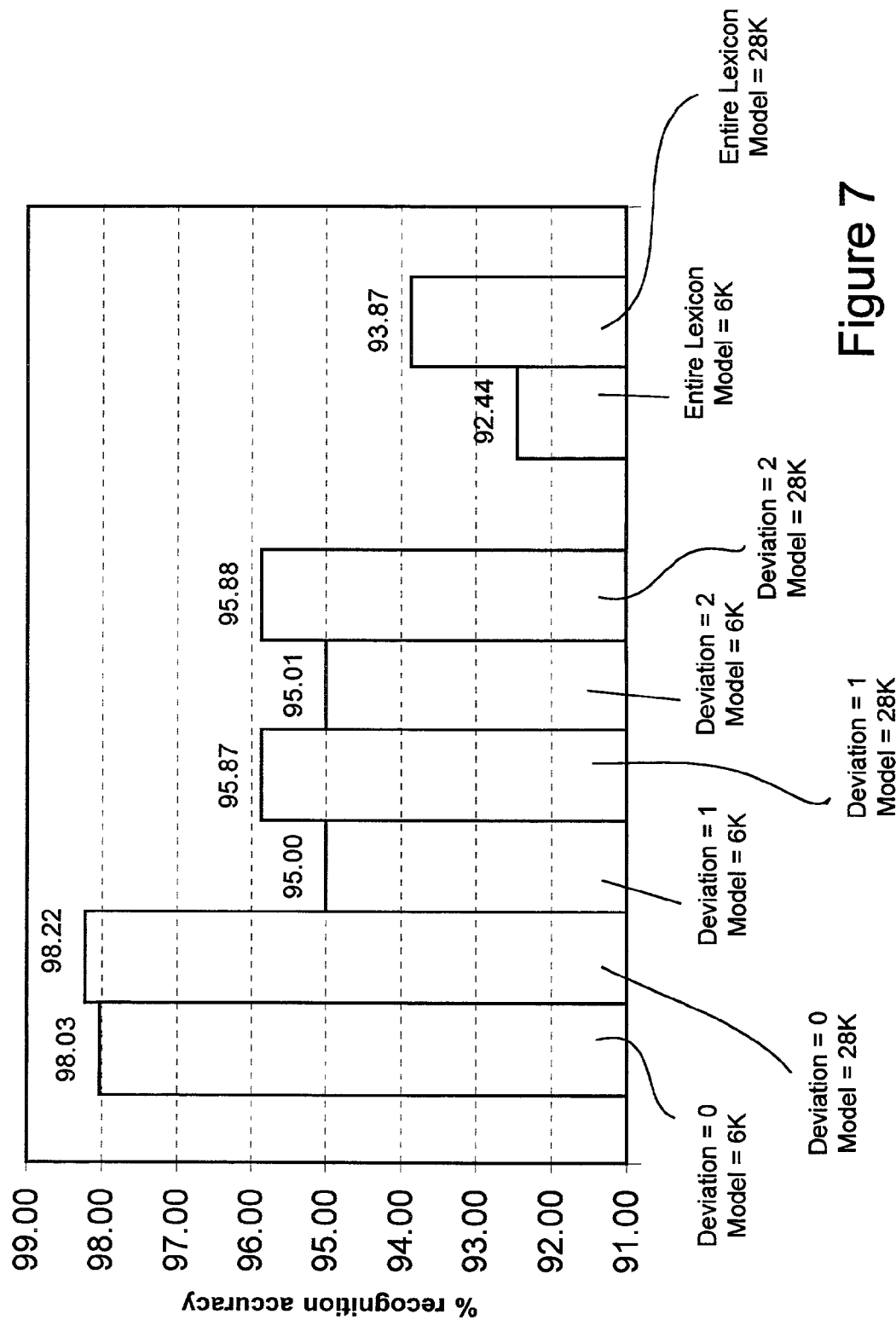
FIG. 7 is a chart illustrating recognition performance of the system of FIG. 4 on a vocabulary test set in a clean environment.
Figure 8:
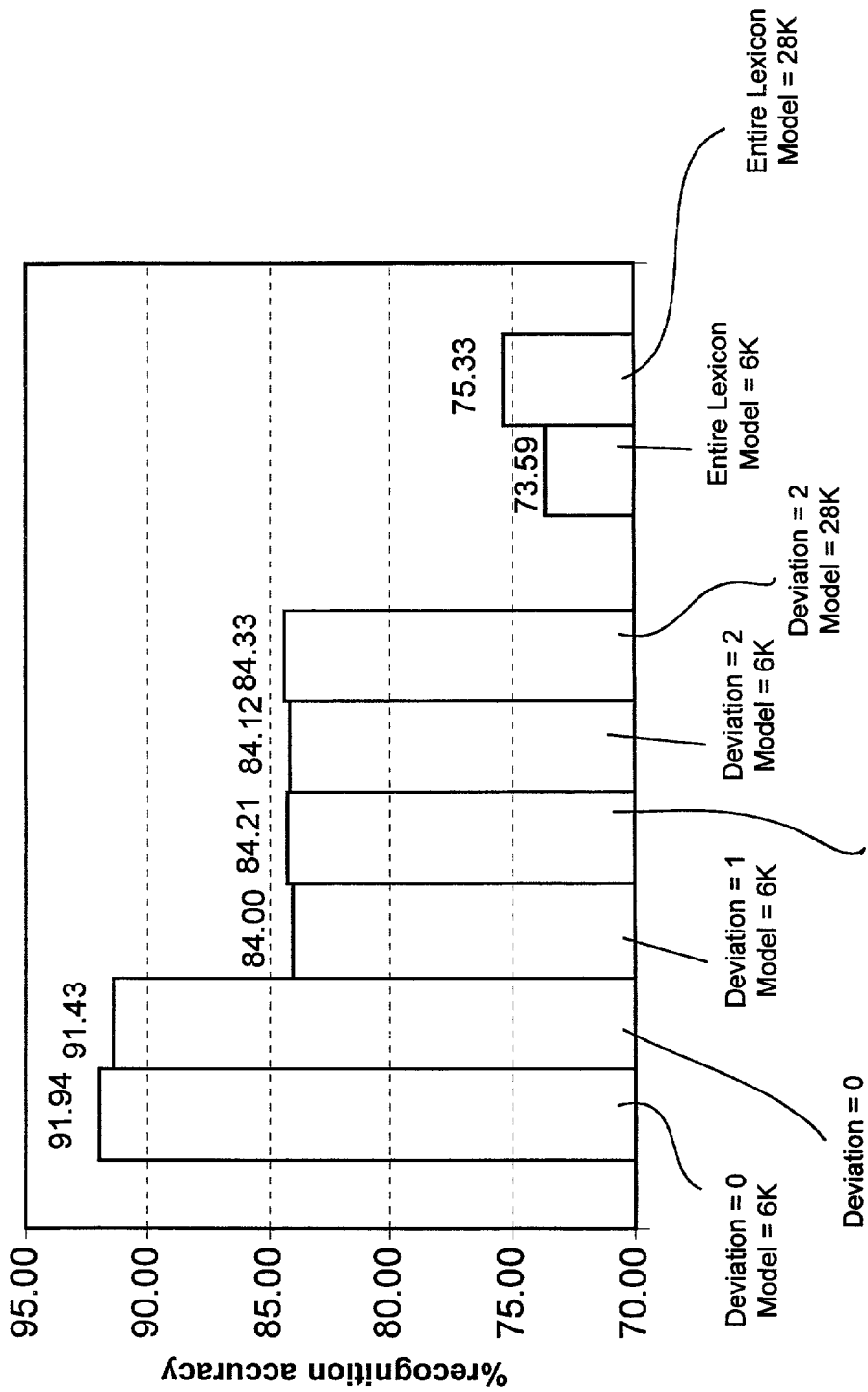
FIG. 8 is a chart illustrating recognition performance of the system of FIG. 4 on a vocabulary test set in a noisy environment.

FIGS. 7 and 8 illustrate recognition performance using the dynamic sub-lexicons approach in accordance with a first aspect of the invention, assuming that the number of the phonemes in the utterance is known a priori to illustrate the potential of the method. The test set contains first and last US names from a 70-word vocabulary. A total of 23 speakers are present in the test set that contains 3150 utterances. The phoneme models used in this experiment were trained on British English speech data, so there is a clear pronunciation mismatch between models and test data. The recognizer is a Hidden Neural Network (HNN) recognizer. The results are given for a clean (laboratory) environment in FIG. 7 as well as a car noise environment (FIG. 8) constructed by mixing car noise to the clean waveforms at a very low SNR (5 dB). Two models are compared, one that requires 6 KB memory and the other 28 KB memory. Larger gains are observed for the smaller one. A deviation of 0 means that only the words with a number of phonemes that matches the number of phonemes in the utterance to be recognized are searched, deviation of 1 means that words with length +/−1 the number of phonemes are searched, and so on. The following table shows the CPU time for searching into the US test database comparing the case of decoding the sub-lexicons delimited by use of the phoneme counter and the case of decoding over the full lexicon.

| Deviation | CPU time |
|---|---|
| 0 | 14.28% |
| 1 | 42.85% |
| 2 | 71.42% |
| Full search | 100.00% |

In the event that there are a large number of entries in the sub-lexicons, an indexing mechanism, for example, hash tables or search trees is employed in order to secure fast access to the sub-lexicon entries.

The invention is not only applicable to phoneme based recognisers but also applies to word based and sub-word based recognisers in general, for example recognisers based on syllables.

Figure 9:
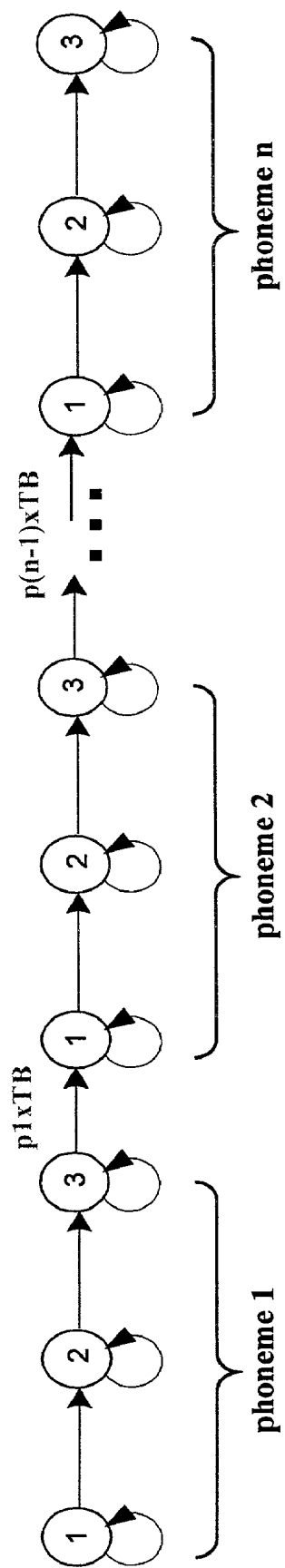
FIG. 9 is a schematic representation of concatenated phoneme models within an HNN framework, showing the function of transition bias.

A second aspect of the invention is illustrated by reference to the word model of FIG. 9. FIG. 9 illustrates a word model within the hidden Neural Network (HNN) framework mentioned above, comprising a concatenation of phoneme models. In a similar way to HMM models, each phoneme 1 . . . n in the HNN model is represented by, for example, a sequence of three left-to-right connected states.

The inter-phoneme transitions are each associated with a probability $p_1 \ldots p_n$, each of which can be different from one another. This results in the system having an inherent preference for and therefore tending to favour words of a particular length. This tendency can be controlled in accordance with the second aspect of the invention by multiplying each transition probability by a constant, referred to herein as the transition bias TB, as indicated in FIG. 9. The constant TB can be a single global constant or can be different for each inter-phoneme model transition.

The effect of the transition bias is as follows. A transition bias larger than 1.0 will make it more likely to exit a phoneme model and enter the next phoneme model during decoding. In contrast, a transition bias smaller than 1.0 will make it more feasible to stay in a phoneme model as long as possible. Thus, the effect can be compared to a very crude form of phoneme duration modelling. By setting the transition bias appropriately, a significant improvement in performance can be obtained. If a single global transition bias is used for all inter-phoneme transitions, then an optimal value of this transition bias can be set according to the number of phonemes in the utterance to be recognised.

Figure 10:
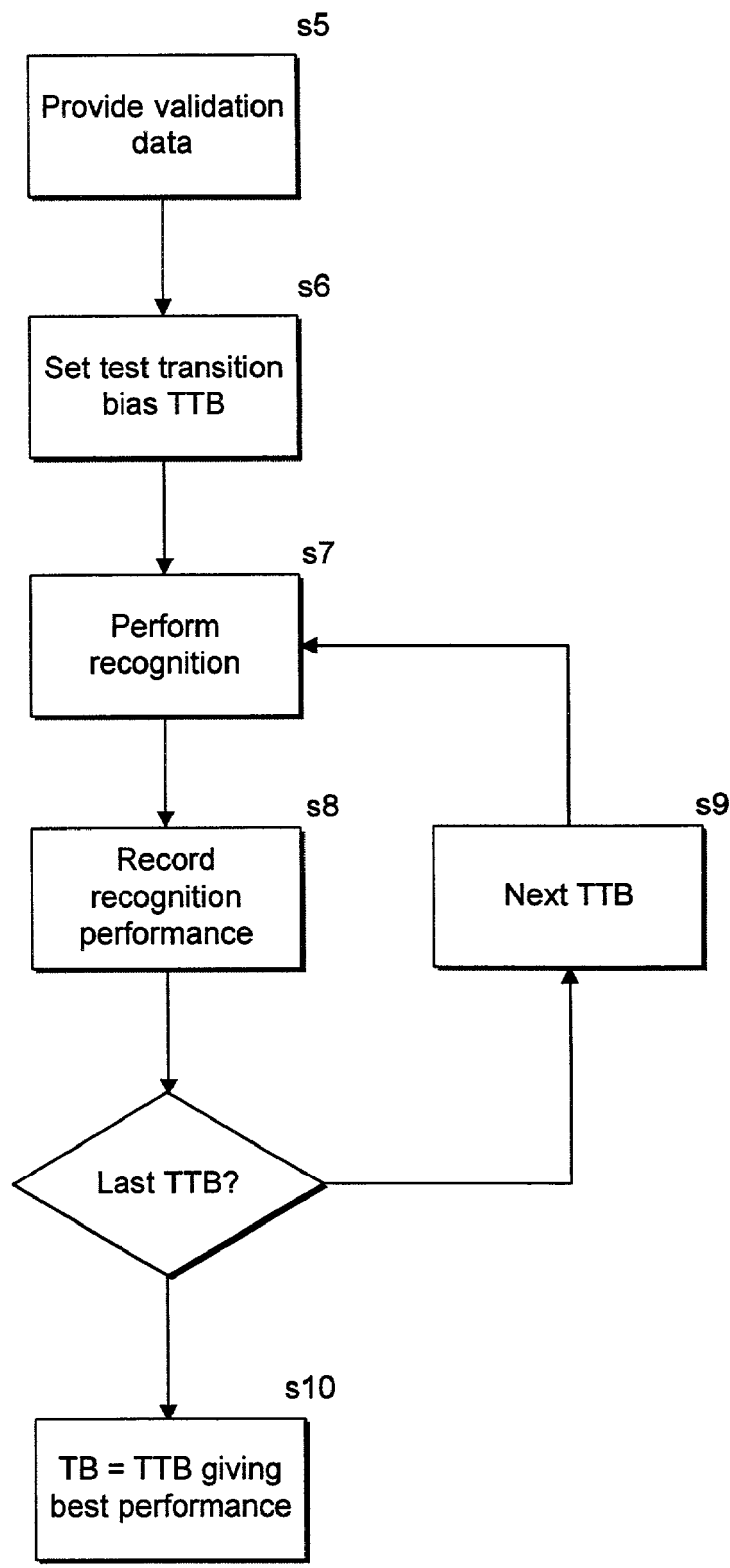
FIG. 10 is a flow diagram illustrating the process of transition bias setting.

However, the number of phonemes in the uttered word is not known a priori before decoding. To circumvent this problem, an average transition bias can be used, which is optimal on average for the recognition vocabulary. For example, referring to FIG. 10, the average optimal bias can be estimated by the use of a validation data set containing utterances from the recognition vocabulary, or a vocabulary that is representative for the expected recognition vocabulary in the usage environment (step s5). A value for transition bias is set from a range of possible TB values, referred to herein as a test transition bias (TTB) (step s6), speech recognition is performed on the validation data set (step s7) and the recognition performance is recorded (step s8). The procedure is repeated with a new value of transition bias (step s9), until the full range of TTB values has been tried. The average optimal transition bias is then simply set to the TTB bias value that maximizes recognition performance on the validation data set (step s10).

Although the use of an average optimal transition bias works well in most cases, some users might define atypical recognition dictionaries (e.g. in name dialling some users might use only first names and others only first plus given names). For such users, the gain in performance by using an average optimal transition bias is lost. Furthermore, the quality of the transition bias estimated from a validation set depends heavily on the available validation data and the estimation procedure needs to be carried out for each new language to be supported.

Figure 11:
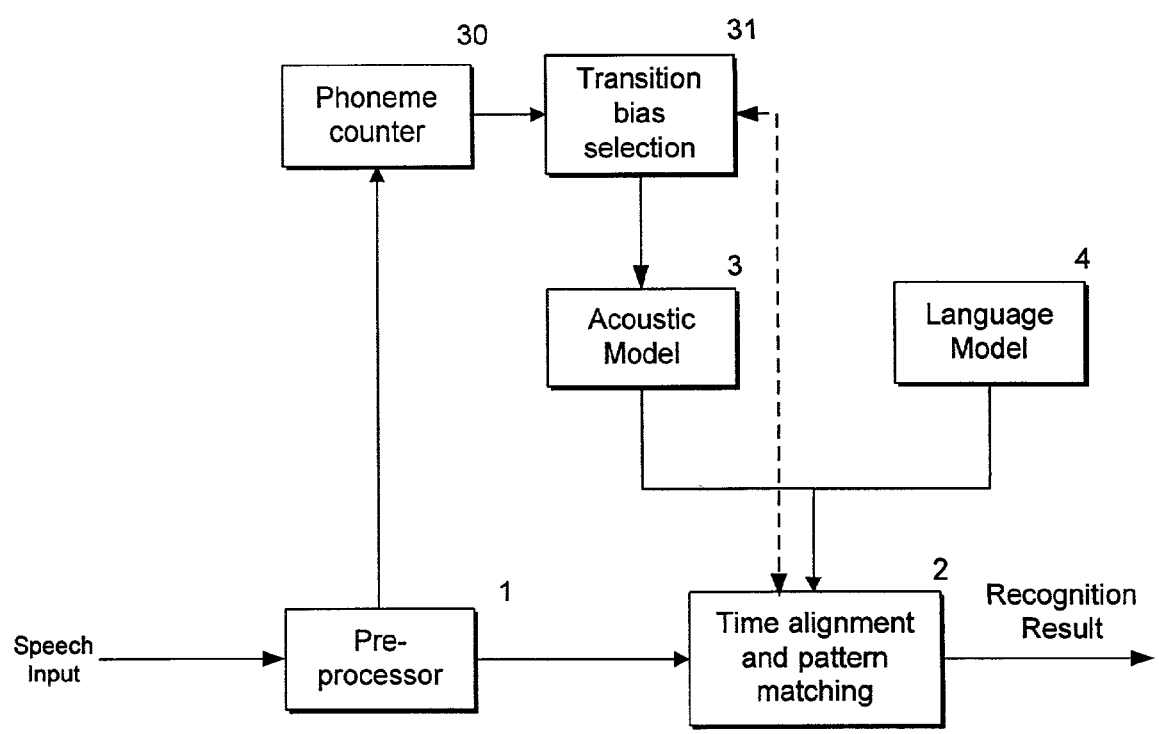
FIG. 11 is a block diagram showing a speech recognition system in accordance with a second embodiment of the invention.

A system for setting a transition bias according to an estimate of the number of phonemes in the uttered word, also described herein as adaptively setting the transition bias, is illustrated in FIG. 11, with the aim of setting a single global transition bias.

Figure 1:
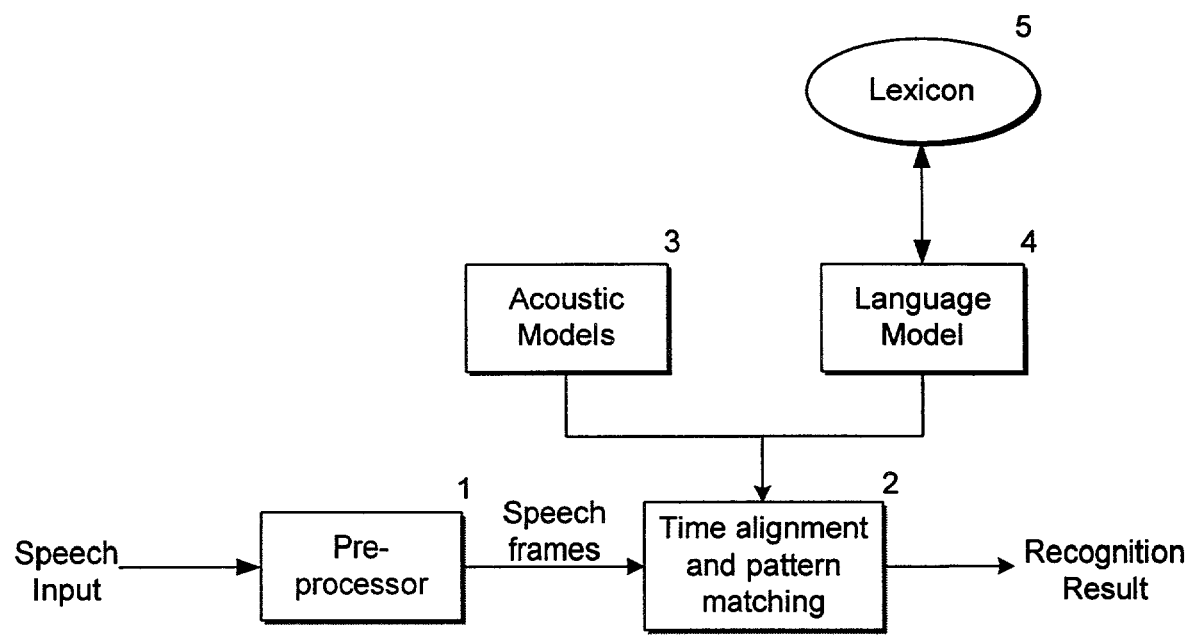
FIG. 1 is a schematic block diagram of a general speaker independent recognition system.

The pre-processor 1, time alignment and pattern matching module 2, acoustic model 3 and language model 4 are the same as those described in relation to FIGS. 1 and 4 above. In addition, the system includes a phoneme counter 30 and transition bias selection module 31.

Figure 12:
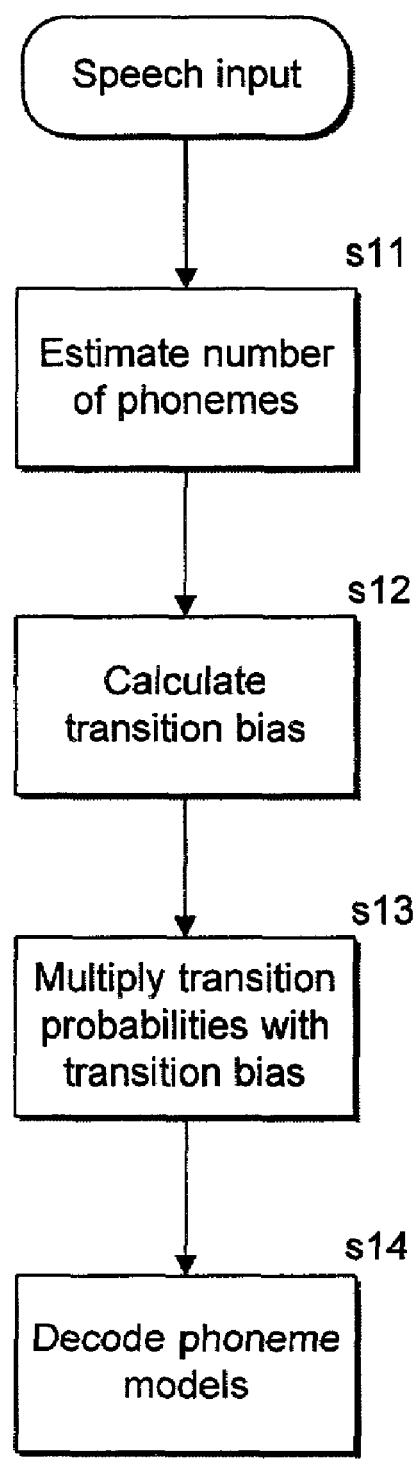
FIG. 12 is a flowchart illustrating the operation of the system of FIG. 11.

FIG. 12 is a flowchart illustrating the operation of the system of FIG. 11. The phoneme counter 30 is used to estimate the number of phonemes in the utterance (step s11). The different possible ways to achieve phoneme count estimates will be described in detail below. The estimate is used by the transition bias selection module 31 to determine the transition bias (step s12), as will be described in detail below. The determined transition bias is then used to multiply all transition probabilities between phonemes (step s13). Word recognition is then performed based on the amended acoustic model 3 (step s14).

The phoneme counter 30 can be an MLP based estimator 23, as explained in connection with FIG. 4 above, in which case feature vectors are extracted from the speech signal and used in the estimation of the number of phonemes, as described in detail in connection with FIG. 4. Other estimation methods are described in detail below.

Tables 1 and 2 below illustrate the effect of using adaptive transition bias on word recognition rate (WRR) performance for the application of three kinds of estimators for estimating the number of phonemes in an utterance, in both clean and noisy environments.

TABLE 1

The effect of applying a transition bias to the US test data

| Method | Clean (WRR) | Noisy (WRR) |
|---|---|---|
| No Bias, Tb = 1.0 | 92.44% | 73.59% |
| Oracle, Table Lookup | 98.03% | 91.94% |
| Oracle, Direct Estimate | 93.33% | 79.97% |
| Free Order Viterbi Estimator, Table Lookup | 93.56% | 79.30% |
| Free Order Viterbi Estimator, Direct Estimate | 93.21% | 79.37% |
| ROS Estimator, Table Lookup | — | — |
| ROS Estimator, Direct Estimate | 93.17% | 78.79% |
| Average optimal Tb | 93.70% | 78.32% |

Table 1 shows results obtained by applying the adaptive transition bias on the US test set, described in detail above in relation to the first embodiment. In this test the HNN phoneme models have a total size of 6 KB and were trained on British English data. The US test set contains a total of 3150 utterances of names from a 70 word vocabulary.

TABLE 2

The effect of applying a transition bias to the Japanese test data

| Method | Clean (WRR) | Noisy (WRR) |
|---|---|---|
| No Bias, Tb = 1.0 | 95.09% | 73.52% |
| Oracle, Table Lookup | 97.43% | 84.53% |
| Oracle, Direct Estimate | 97.51% | 84.26% |
| Free Order Viterbi Estimator, Table Lookup | 97.11% | 81.37% |
| Free Order Viterbi Estimator, Direct Estimate | 97.35% | 82.39% |
| ROS Estimator, Table Lookup | 97.27% | 83.84% |
| ROS Estimator, Direct Estimate | 97.36% | 83.95% |
| Average optimal TB | 97.35% | 83.15% |

Table 2 shows the effect of the adaptive transition bias when applied to the Japanese test database. The Japanese test database contains 11992 Japanese utterances based on a 120 word vocabulary. The Japanese models have a total size of 3 KB.

The structure of Tables 1 and 2 above will now be described in detail.

The first row "Tb=1.0" indicates performance (word recognition rate) when no transition bias is used.

The next two rows, labelled "Oracle", show performance when the length of the word to be decoded is assumed to be known exactly before decoding, i.e., the adaptive transition bias is set according to the true length. Oracle corresponds to an upper limit of performance.

The next four rows illustrate performance when the estimated number of phonemes is used, based on two estimation techniques, Free Order Viterbi Estimator and Rate of Speech Estimator, which will be described in detail below.

The final row labelled "Average Optimal TB" corresponds to decoding with a single constant average optimal transition bias, which has been estimated on a validation data set based on the same vocabulary as in the test sets.

A comparison of the first row with the other rows in each table indicates that performance with transition bias applied is an improvement over performance with no transition bias, regardless of the particular transition biasing scheme used.

The various estimation methods used are described in more detail below:

Speaker Specific Rate of Speech Estimator

For each speaker an estimate of the Rate of Speech (ROS) is continuously updated during use of the recognizer. The ROS detector measures the number of speech observations (usually 10 ms frames of speech) per phoneme on average. During use of the recognizer it is assumed that it is known whether an utterance is correctly recognized or not (in a name dialling application for mobile phones, it is known if the just uttered name was correctly recognized as the user would otherwise have cancelled the call). Based on the correctly recognized utterance the current ROS estimate is updated as follows:

$$ROS(n) = \gamma ROS(n-1) + (1-\gamma)\frac{N_{Speechframes}(n-1)}{N_{Phonemes}(n-1)}$$

where $N_{Speechframes}$ (n) is the number of speech observations (non-silence frames) in the nth correctly recognized utterance, $N_{Phonemes}$ (n) is the number of phonemes in the word corresponding to the nth correctly recognized utterance and $\gamma$ is a weighting factor in the range 0-1. A weighting factor close to 1 implies that the latest estimate of the ROS based on the last recognized utterance only contributes marginally to the running average. A weighting factor close to 0 implies that the ROS estimate is based almost entirely on the last recognized utterance. The number of speech frames is simply found using a noise robust speech endpoint detector. From the current ROS estimate it is straightforward to calculate an estimate of the number of phonemes in the utterance to be recognized:

$$\hat{N}_{Phonemes}(n) = \frac{\hat{N}_{Speechframes}(n)}{ROS(n-1)}$$

where $\hat{N}_{Speechframes}$ (n) is again found using a robust speech endpoint detector.

A speaker specific ROS estimator represents the simplest mode of implementation in terms of computational complexity. The disadvantage of this approach is that knowledge about whether an utterance is correctly recognized or not is needed. As mentioned above, in a name dialing application this will not pose a serious problem, as the user is very likely to give feedback about the correctness of the recognition, i.e., if a wrong name is recognized the user is very likely to cancel the call to the number associated with the recognized name. However, for other applications like command word recognition, such "supervision" information might not be available from the user. In such cases $N_{Phonemes}$ (n) can be set to the number of phonemes in the highest scoring word (the recognised one). Even though this word is not the correct one, it will typically have a number of phonemes which is close to that of the correct word.

The main assumptions in the above approach is that the speaker has a fairly constant speaking rate and that a single average ROS for every possible phoneme is sufficient for the purpose of estimating the number of phonemes in a word. If a speaker changes speaking style in an abrupt manner, the speaker specific ROS estimate can be highly inaccurate. Similarly, the phoneme count estimate may be very poor for words that mainly contain phonemes that have a "true" ROS far away from the estimated "average" speaker specific ROS.

Free Order Viterbi Decoder

The utterance is decoded using an unconstrained grammar, also known as a free order or looped grammar. The Viterbi decoder gives a state segmentation of the utterance, which can be translated into a phoneme sequence. Usually the obtained phoneme sequence is a fairly poor match to the true phoneme sequence in the uttered word. However, only the number of consecutive different phonemes in the segmentation is required from the free order Viterbi decoding.

From the estimated length using one of the two above described methods (step s11), or some other method such as the MLP detector described in relation to FIG. 4, the transition bias to use for decoding the current utterance is selected in one of two ways (step s12), by table lookup or direct estimation, as shown in separate rows in Tables 1 and 2 for each of the estimation methods:

Table Lookup

The optimal bias is selected according to a scheme as shown in the table below.

| Number of phonemes | Optimal Transition bias |
| --- | --- |
| 1-6 | 1.0 |
| 6-8 | 4.0 |
| 8-10 | 6.0 |
| ≧10 | 10.0 |

Direct Estimate

The optimal bias is simply set proportional to the estimated number of phonemes in the utterance, for example equal to the estimated number of phonemes. If the estimated number of phonemes is less than 1, then the bias is set to 1.0.

Further calibration of how to select the optimal bias from the estimate of the number of phonemes can provide increased gains in recognition performance.

Similarly, development of a more accurate estimator for the number of phonemes in a spoken utterance can improve performance. Finally, separate transition biases for different phoneme models can be used so as to introduce a more detailed form of phoneme duration modelling.

After multiplication of the transition probabilities by the selected transition bias (step s13), the concatenated phoneme models for each word are decoded using a forward decoder (step s14). This has been observed to give better results than a Viterbi decoder, while only adding a marginal contribution to decoding complexity. Since the transition bias is applied before decoding, the optimal value of the bias is therefore computed before starting decoding. This implies that the whole utterance must be spoken before decoding can start. For tasks like name dialing this may not pose a problem, as the utterances are usually very short and the recognition result is therefore ready with a very small lag.

Figure 13:
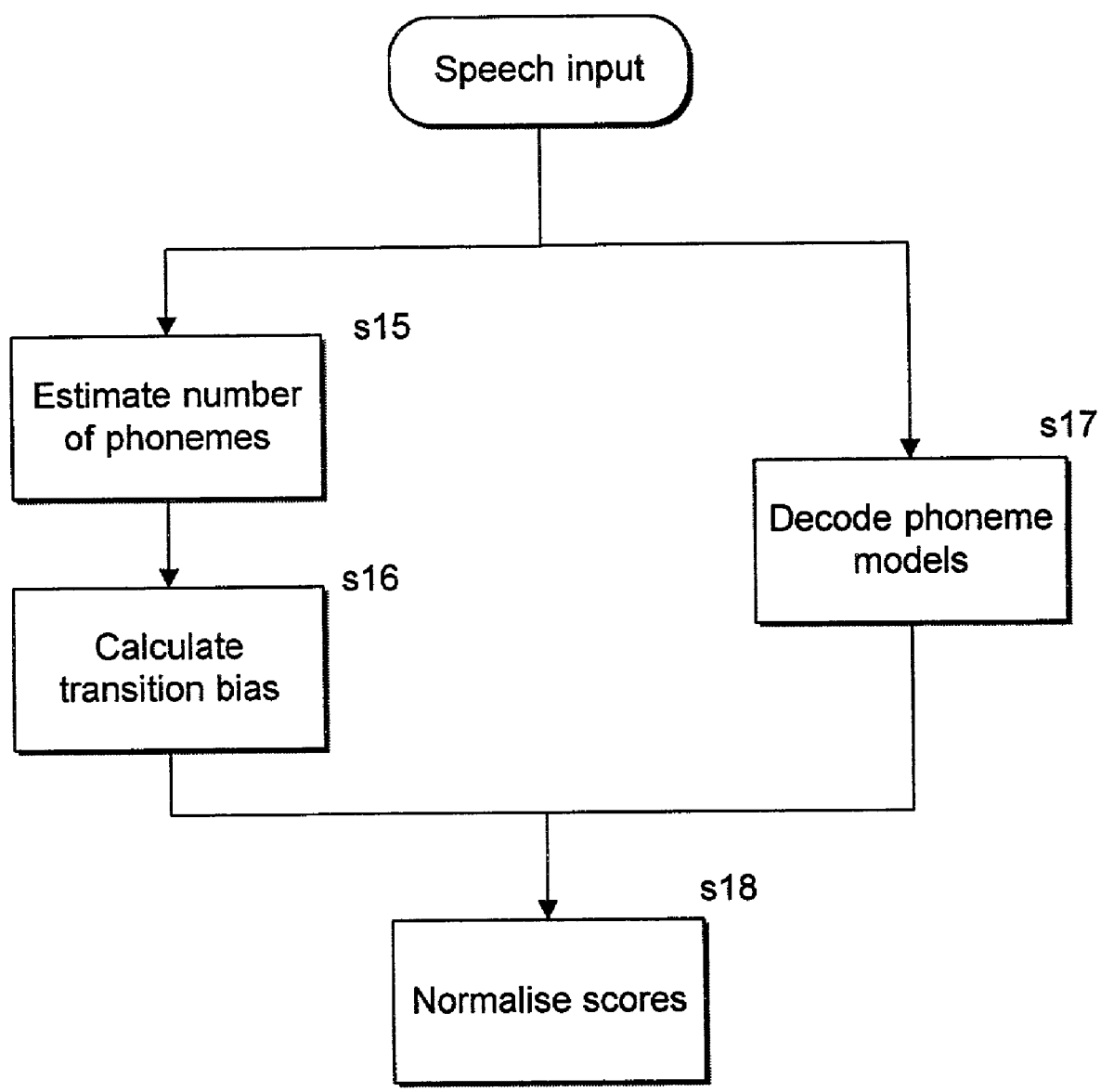
FIG. 13 is a flowchart illustrating an alternative recognition process.

Referring to FIG. 13, if "true" real-time decoding is required, in which the result is available immediately after the speaker finishes speaking, the phoneme count estimation (step s15) and optimal bias calculation (step s16) proceeds in parallel with the decoding of the concatenated phoneme models without a transition bias, ie. the transition bias is equal to 1.0 (step s17). At the end of decoding, all scores are normalized by a contribution proportional to the optimal transition bias (step s18). The following expression has been found to work well in practice, where $w_i$ is the i th word in the vocabulary.

$$\log(\text{score}(w_i)) = \log(\text{score}(w_i)) + \log(Tb_{optimal})N_{Phonemes}(w_i)$$

If a Viterbi decoder is used, this normalization will give exactly the same change in the score compared to using a bias of 1.0 as if the optimal transition bias was applied before Viterbi decoding. This is due to the fact that the Viterbi decoder only finds the single most optimal path through the sequence of phoneme models corresponding to a word. Therefore, if the word contains $N_{Phonemes}$ phonemes, the change in log-score by applying the optimal bias before decoding is exactly $\log(Tb_{optimal})N_{Phonemes}$ as the transition bias enter the log-score in an additive way. The output of the forward decoder is, on the other hand, a sum over all possible paths through the model, and the above expression is therefore only approximately true.

Figure 14:
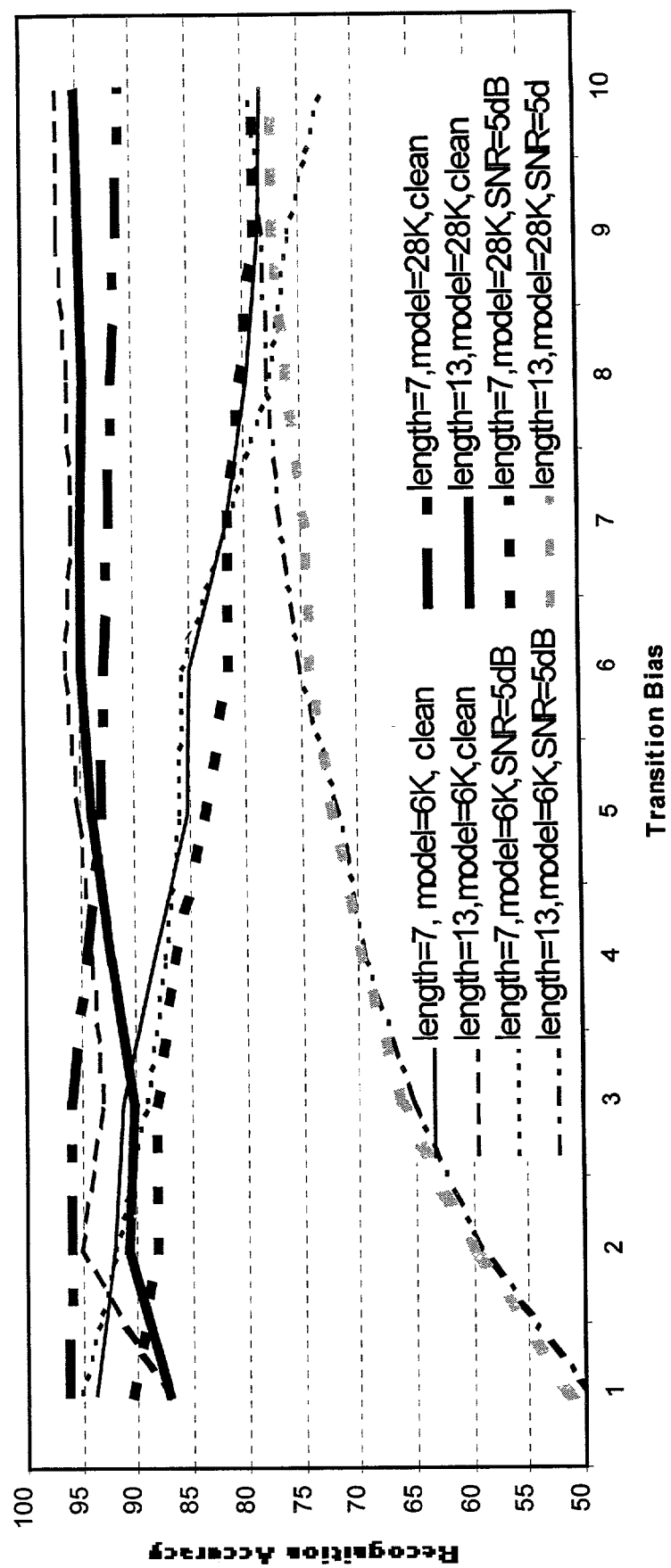
FIG. 14 is a graph illustrating the impact of transition bias on relatively short and long utterances in a vocabulary test set.

FIG. 14 shows how the use of an adaptive transition bias improves the performance of an HNN by affecting the recognition of relatively short and long utterances. It particularly illustrates recognition performance of names containing 7 and 13 phonemes from the US test set. As mentioned above, the US test set contains first and last US names from a 70-word vocabulary and total of 23 speakers are present in the test set. The HNN phoneme models used in this experiment were trained on British English speech data, so there is a clear pronunciation mismatch between models and test data. The results are given for a clean (laboratory) environment as well as a car noise environment constructed by mixing car noise to the clean waveforms at a very low SNR (5 dB) for two different models 6 KB and 28 KB respectively. There is a clear pattern in recognition performance for different values of the TB. For instance, using a TB of 10 for the long names in the noisy environment increases the performance of the small 6 KB model from 50% to 80%. At the same time using a TB of 10 for the short names drops the performance from 95% to 78% for the 6 KB model in the noisy environment. Therefore, by adapting the transition bias depending on whether the utterance contains short or long words, recognition performance can be improved.

While a specific example of speech recognition has been given in the context of a mobile telephone, it will be understood that the invention is applicable to a wide variety of speech recognition tasks in all types of portable device, including for example, personal digital assistants as well as personal computers.

The invention claimed is:

1. A speech recognition system in which a word to be recognized is represented as a sequence of phonetic segment models in which a transition probability represents the probability of the occurrence of a transition between the models, comprising:

means for estimating the number of phonetic segments in the word to be recognized; and means for biasing the transition probabilities in dependence on the estimated number of phonetic segments in the word.

2. A speech recognition system according to claim 1, wherein the biasing means comprise means for applying a transition bias to each of the transition probabilities between a plurality of phonetic segment models.

3. A speech recognition system according to claim 2, operable to recognize words from a recognition vocabulary, wherein the transition bias is calculated as the transition bias which maximizes recognition performance on a validation data set which represents the recognition vocabulary.

4. A speech recognition system according to claim 3, wherein the validation data set has the same vocabulary as the recognition vocabulary.

5. A speech recognition system according to claim 1, wherein the estimating means comprises a speaker specific rate of speech estimator.

6. A speech recognition system according to claim 1, wherein the estimating means comprises a Free Order Viterbi decoder.

7. A speech recognition system according to claim 1, wherein the estimating means comprises a neural network classifier.

8. A speech recognition system according to claim 1, wherein the transition bias is set in response to the result of the estimating means.

9. A speech recognition system according to claim 8, comprising table look-up means for setting the transition bias in accordance with the number of phonetic segments in the word.

10. A speech recognition system according to claim 8, comprising direct setting means for setting the transition bias as proportional to the number of phonetic segments in the word.

11. A speech recognition system according to claim 10, wherein the direct setting means is arranged to set the transition bias to be equal to the number of phonetic segments in the word.

12. A speech recognition system according to claim 1, wherein each phonetic segment comprises a phoneme.

13. A speech recognition system according to claim 1, further comprising means for performing word recognition for the word on an individual basis based on the biased transition probabilities.

14. A speech recognition system according to claim 13, further comprising means for performing word recognition for each word in a multiword sentence based on a biased transition probability determined separately for each corresponding word in the sentence based on the estimated number of phonetic segments in the each corresponding word.

15. A speech recognition system in which a word to be recognized is represented as a sequence of phonetic segment models in which a transition probability represents the probability of the occurrence of a transition between the models, comprising:
  a phonetic segment estimator arranged to output an estimate of the number of phonetic segments in the word; and
  a processing module for applying a transition bias to the transition probability in dependence on the estimate of the number of phonetic segments in the word.

16. A portable communications device including a speech recognition system according to claim 15.

17. A speech recognition system according to claim 15, wherein the processing module is configured to perform word recognition for the word on an individual basis based on the biased transition probabilities.

18. A speech recognition system according to claim 17, wherein the processing module is configured to perform word recognition for each word in a multiword sentence based on a biased transition probability determined separately for each corresponding word in the sentence based on the estimated number of phonetic segments in the each corresponding word.

19. A method of speech recognition in which a word to be recognized is represented as a sequence of phonetic segment models in which a transition probability represents the probability of the occurrence of a transition between the models, the method comprising biasing the transition probabilities in dependence of the number of phonetic segments in the word.

20. A method according to claim 19, comprising decoding the sequence of phonetic segment models after application of the transition bias.

21. A method according to claim 19, comprising decoding the sequence of phonetic segment models without the application of transition bias and normalizing the resulting scores by a contribution proportional to the transition bias.

22. A method according to claim 21, comprising calculating the transition bias in parallel with the decoding of the sequence of phonetic segment models.

23. A method according to claim 19, further comprising performing word recognition for the word on an individual basis based on the biased transition probabilities.

24. A method according to claim 23, further comprising performing word recognition for each word in a multiword sentence based on a biased transition probability determined separately for each corresponding word in the sentence based on the estimated number of phonetic segments in the each corresponding word.

25. A method comprising:
  receiving a word to be recognized represented as a sequence of phonetic segment models in which a transition probability represents the probability of the occurrence of a transition between the models;
  biasing the transition probabilities in dependence of the number of phonetic segments in the word; and
  performing word recognition for the word on an individual basis based on the biased transition probabilities.

26. A method according to claim 25, further comprising performing word recognition for each word in a multiword sentence based on a biased transition probability determined separately for each corresponding word in the sentence based on the estimated number of phonetic segments in the each corresponding word.

27. An apparatus comprising a processing element configured to:
  estimate a number of phonetic segments in a word to be recognized; and
  bias transition probabilities in dependence on the estimated number of phonetic segments in the word to be recognized,
  wherein the word to be recognized is represented as a sequence of phonetic segment models in which a transition probability represents the probability of the occurrence of a transition between the models.

* * * * *

UNITED STATES PATENT AND TRADEMARK OFFICE
CERTIFICATE OF CORRECTION

PATENT NO. : 7,319,960 B2  Page 1 of 1
APPLICATION NO. : 10/020895
DATED : January 15, 2008
INVENTOR(S) : Riis et al.

It is certified that error appears in the above-identified patent and that said Letters Patent is hereby corrected as shown below:

Column 14,

Line 29, after "comprising" insert --means for--.

Signed and Sealed this

Twenty-seventh Day of May, 2008

JON W. DUDAS
*Director of the United States Patent and Trademark Office*